(12) United States Patent
Gamsjäger

(10) Patent No.: US 10,744,881 B2
(45) Date of Patent: Aug. 18, 2020

(54) POSITIONING UNIT FOR A CHARGING STATION AND METHOD FOR MAKING CONTACT

(71) Applicant: SCHUNK BAHN- UND INDUSTRIETECHNIK GMBH, Bergheim (AT)

(72) Inventor: Tobias Gamsjäger, Salzburg (AT)

(73) Assignee: SCHUNK TRANSIT SYSTEMS GMBH, Bergheim (AT)

( * ) Notice: Subject to any disclaimer, the term of this patent is extended or adjusted under 35 U.S.C. 154(b) by 328 days.

(21) Appl. No.: 15/754,132

(22) PCT Filed: Aug. 31, 2016

(86) PCT No.: PCT/EP2016/070473
§ 371 (c)(1),
(2) Date: Feb. 21, 2018

(87) PCT Pub. No.: WO2017/042065
PCT Pub. Date: Mar. 16, 2017

(65) Prior Publication Data
US 2018/0236885 A1    Aug. 23, 2018

(30) Foreign Application Priority Data

Sep. 11, 2015  (DE) .......................... 10 2015 217 380

(51) Int. Cl.
*H02J 7/00* (2006.01)
*B60L 11/18* (2006.01)
(Continued)

(52) U.S. Cl.
CPC ............. *B60L 11/1827* (2013.01); *B60L 5/28* (2013.01); *B60L 53/14* (2019.02); *B60L 53/30* (2019.02);
(Continued)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS 4,569,489 A * 2/1986 Frey ...................... B65H 59/38
242/390.1
4,969,631 A * 11/1990 Whittingham ............ B60S 9/08
254/425
(Continued)

FOREIGN PATENT DOCUMENTS

AT            333337 T     8/2006
CN          202806409 U    3/2013
(Continued)

*Primary Examiner* — Arun C Williams
(74) *Attorney, Agent, or Firm* — King & Schickli, PLLC

(57) ABSTRACT

A positioning unit (10) and a method for forming an electrically conductive connection between a vehicle and a charging station, said positioning unit being able to be arranged above the vehicle, an electrical charging contact of the charging station movable relative to a contact surface of the vehicle and contacted by the positioning unit including a hinged arm element (11) and a drive element (12) for driving the hinged arm element, said drive element comprising a displacement drive (29) for exerting a displacement force acting on the hinged arm element and a spring element (31) mechanically interacting with the displacement drive, the spring element having at least one contact spring (32), said displacement drive and said contact spring being coupled to each other in a mechanical series circuit (53) such that a contact force can be exerted on the contact surface from the displacement drive and the contact spring.

21 Claims, 7 Drawing Sheets

(51) Int. Cl.
  *B60L 5/28*   (2006.01)
  *B60L 53/30*   (2019.01)
  *B60L 53/14*   (2019.01)
  *B60L 53/35*   (2019.01)
  *B60L 53/36*   (2019.01)

(52) U.S. Cl.
  CPC ............... *B60L 53/32* (2019.02); *B60L 53/35* (2019.02); *B60L 53/36* (2019.02); *H02J 7/0042* (2013.01); *B60L 2200/18* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01)

(56) References Cited

U.S. PATENT DOCUMENTS

| | | | |
|---|---|---|---|
| 5,306,999 A * | 4/1994 | Hoffman | B60L 53/305 320/109 |
| 9,056,555 B1 * | 6/2015 | Zhou | B60L 11/1827 |
| 2003/0164642 A1 * | 9/2003 | Bigsby | B60T 13/02 303/1 |
| 2011/0074351 A1 * | 3/2011 | Bianco | E04H 6/025 320/109 |
| 2012/0111682 A1 | 5/2012 | Andre | |
| 2012/0321381 A1 * | 12/2012 | Ohgitani | B60K 1/04 403/376 |
| 2013/0076902 A1 | 3/2013 | Gao et al. | |
| 2013/0221177 A1 * | 8/2013 | Ishii | F16M 13/00 248/299.1 |
| 2014/0070767 A1 * | 3/2014 | Morris | B60L 53/18 320/109 |
| 2017/0158072 A1 * | 6/2017 | Sychov | B60L 53/00 |

FOREIGN PATENT DOCUMENTS

| | | |
|---|---|---|
| CN | 10153114 | 3/2014 |
| CN | 104290606 A | 1/2015 |
| CN | 104442454 A | 3/2015 |
| DE | 2522876 A1 | 12/1976 |
| DE | 4334716 A1 | 4/1995 |
| DE | 102013206840 A1 | 10/2014 |
| DE | 202014007218 U1 | 10/2014 |
| EP | 2457764 A1 | 5/2012 |
| EP | 2586645 A2 | 5/2013 |
| JP | 2012080628 A | 4/2012 |
| WO | 2015022008 A1 | 2/2015 |

* cited by examiner

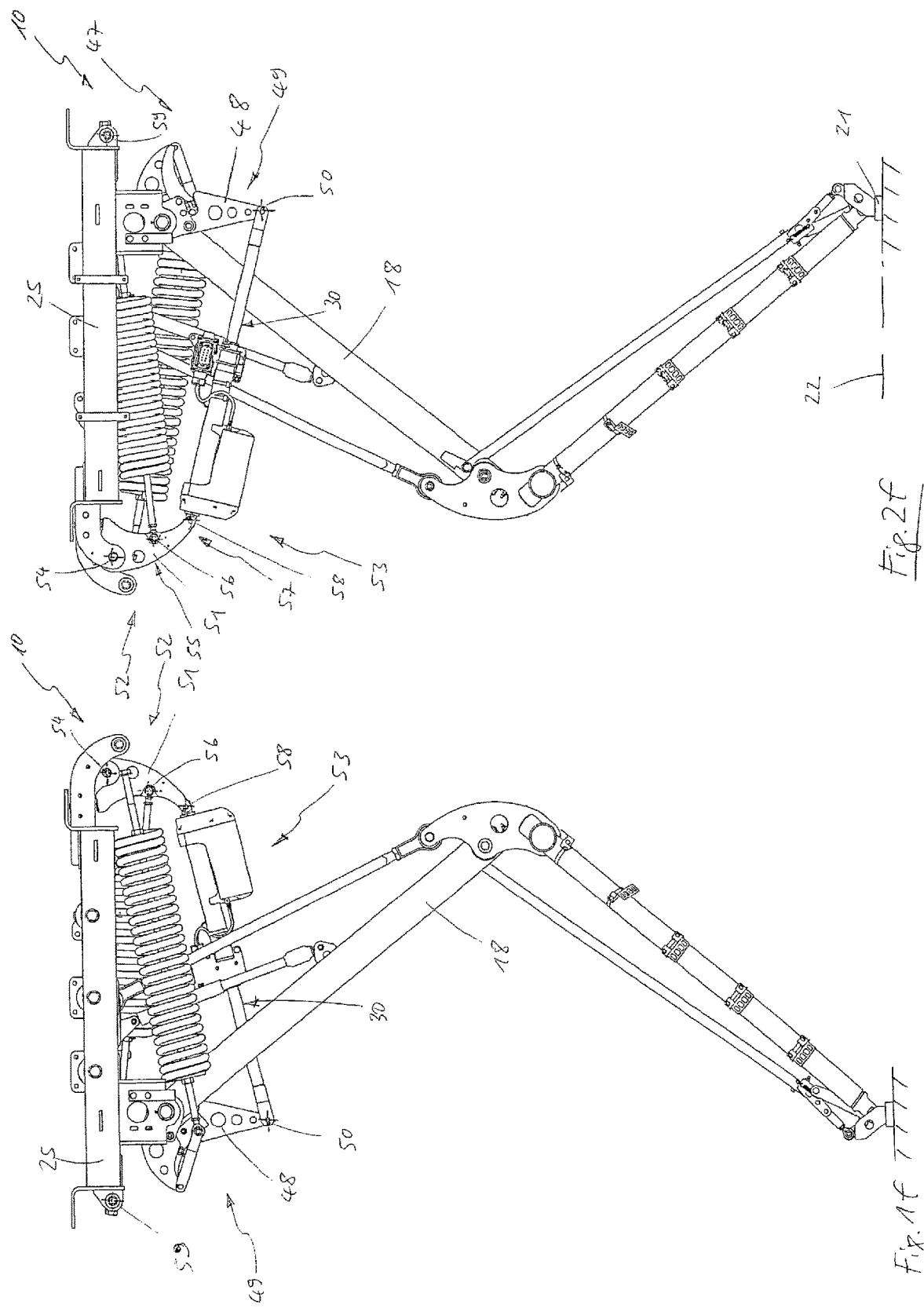

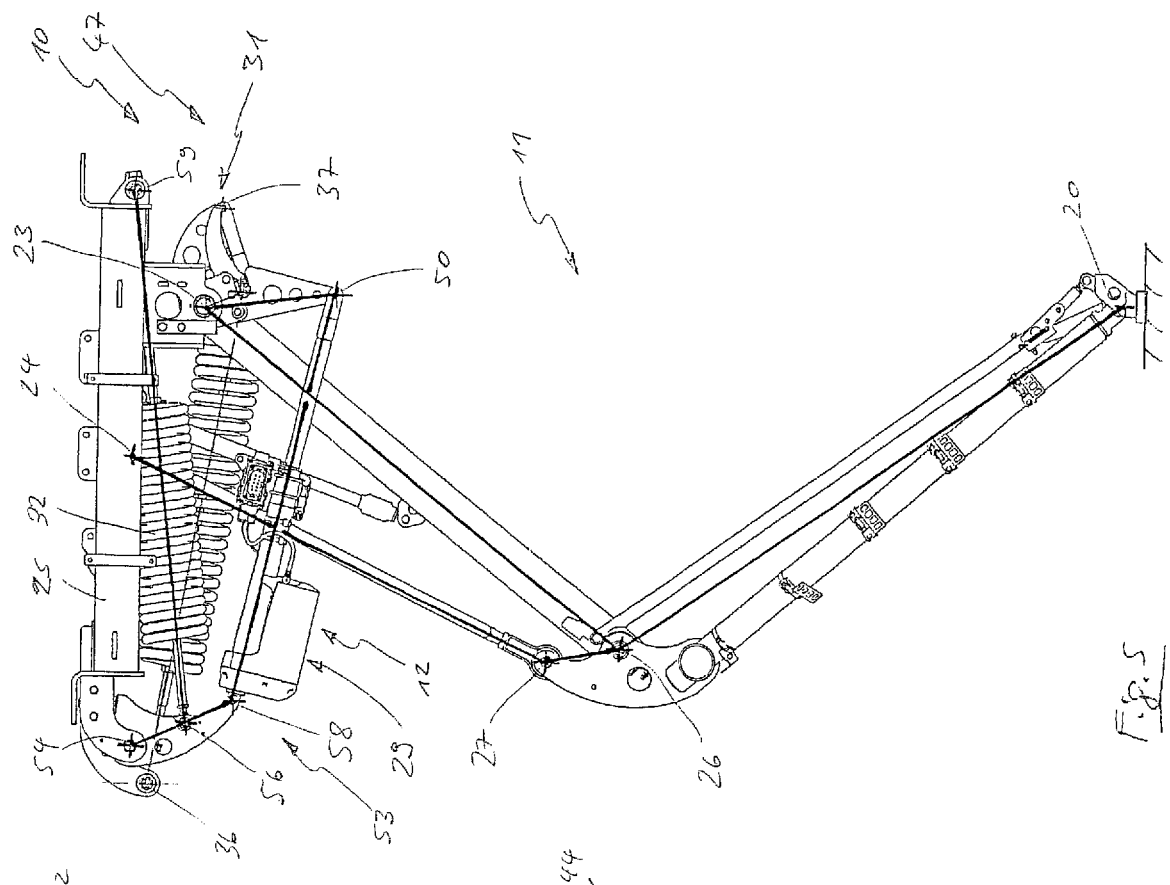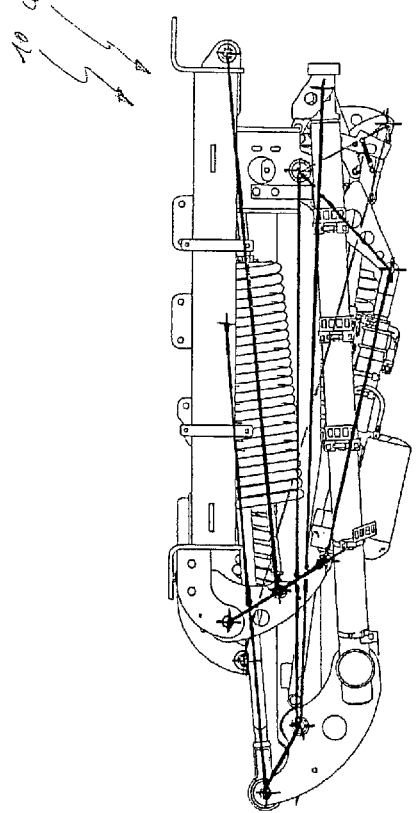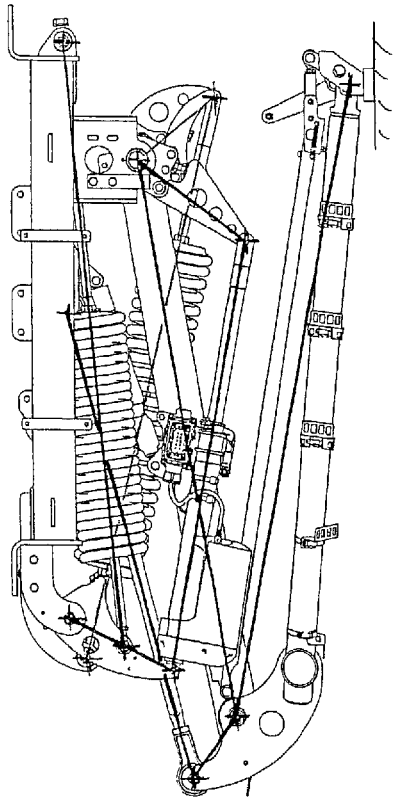

POSITIONING UNIT FOR A CHARGING STATION AND METHOD FOR MAKING CONTACT

FIELD OF THE INVENTION

The invention relates to a positioning unit for a charging station of an electrically driven vehicle as well as to a method for realizing an electrically conductive connection between the vehicle, in particular an electric bus or similar, and the charging station, said positioning unit being able to be arranged above a vehicle, an electrical charging contact of the charging station being able to be moved relative to a contact surface of the vehicle and be connected thereto by means of the positioning unit, said positioning unit comprising a hinged arm element and a drive element for driving the hinged arm element, said drive element comprising a displacement drive for exerting a displacement force acting on the hinged arm element and a spring element mechanically interacting with the displacement drive.

BACKGROUND OF THE INVENTION

Such positioning units and methods are known from the state of the art and are commonly used in electrically driven vehicles, which commute between stops. These vehicles can be electric busses or generally any other kind of vehicle, such as trains or trams, which are not permanently electrically connected to an overhead wire or similar. In these vehicles, an electrical energy storage is charged by a charging station during stopovers at a stop. The vehicle is electrically connected to the charging station at the stop, said energy storage being charged at least sufficiently so that the vehicle can reach the next stop using a charging station. In order to attain an electrical connection between the vehicle and the charging station, a positioning unit is used which can be mounted to a vehicle roof and connects a charging contact of the vehicle to a contact surface of the charging station above the vehicle. It is also known to use positioning units which are mounted or positioned above the vehicle at the respective stop. A charging contact of the charging station is then moved in direction of a contact surface on a roof of the vehicle and an electrical connection is attained. In this variation of contacting the vehicle, all charging stations must be equipped with a corresponding positioning unit along a route, for which reason the positioning unit must be particularly inexpensive, reliable as well as low-maintenance.

SUMMARY OF THE INVENTION

When bringing the charging station and the contact surface of the vehicle together, it is essential that the charging contact is pressed onto the contact surface by exerting a defined contact force in order to be able to attain a safe electrical connection. A positioning unit for exerting a defined contact force is known from DE 43 34 716 A1, said positioning unit serving for collecting current at an overhead wire and the contact force being measured and controlled by the positioning unit.

A positioning unit for being arranged above a vehicle is known from DE 20 2014 007 218 U1, said positioning unit having a hinged arm element and a drive element. The drive element comprises a displacement drive and a spring element which serve to move the hinged arm element relative to a contact surface of the vehicle. In particular an upward movement of the hinged arm element requires a displacement force from the displacement drive.

In the known positioning units, it is generally detrimental that these positioning units have to be formed or arranged for a defined contact height, i.e. a distance of the positioning unit in a retracted position for storing the charging contact, relative to a contact position for transferring current to the vehicle. This means that a relative distance of the contact position and the retracted position cannot be used variably and must be regularly set or adjusted through constructive changes since, otherwise, the required or rather desired contact force cannot be exerted on the contact surface. This is inconsequential to the extent that as long as vehicles having the same height make stops at the respective stop or charging station. If, however, vehicle types and thus vehicle heights change, a relative distance of the retracted position and the contact position can fluctuate greatly owing to fluctuating heights of the contact surfaces of the vehicles over a road. The same applies to a different load of a vehicle. Furthermore, in particular busses can be lowered in the area of a stop in order to make it easier for physically impaired passengers to access the bus. This lowering of the bus brings about a change in height of a contact surface relative to the road and, if the bus is lowered on only one side, a tilting of the bus along its longitudinal axis. Consequently, the contact surface on the roof of the bus moves in a horizontal or vertical direction relative to the charging contact along with its tilting movement. This makes it nigh impossible to realize the contact force of the charging contact of the charging station desired for a safe electrical connection at the contact surface of the vehicle in the application described above. Adjusting a contact force by using sensors and a control is cumbersome and high-maintenance in contrast, driving the production and operating costs of a positioning unit skyward.

It is therefore the object of this invention to propose a positioning unit and a method for realizing an electrically conductive connection between a vehicle and a charging station, which would respectively enable safely contacting the vehicle while simultaneously keeping acquisition and operating costs low.

This object is attained by a positioning unit having the features of claim 1, a charging station having the features of claim 16, and a method having the features of claim 17.

The positioning unit according to the invention for a charging station of an electrically driven vehicle, in particular an electric bus or similar, can be arranged above a vehicle, an electrical charging contact of the charging station being able to be moved relative to a contact surface of the vehicle and be contacted thereto by means of the positioning unit, said positioning unit comprising a hinged arm element and a drive element for driving the hinged arm element, said drive element comprising a displacement drive for exerting a displacement force acting on the hinged arm element and a spring element mechanically interacting with the displacement drive, said spring element comprising at least one contact spring, said spring element having at least one contact spring, said displacement drive and said contact spring being coupled to each other in a mechanical series circuit in such a manner that a contact force can be exerted on the contact surface from the displacement drive and the contact spring.

The positioning unit accordingly is a component of a stationary charging station for an electrically driven vehicle and serves to move the charging contact of the charging station on a contact surface of the vehicle, preferably arranged on a vehicle roof, and to contact the charging contact thereto. It thus becomes possible to supply the vehicle with electrical energy during a stop at the charging station and to store said electrical energy in the vehicle. The hinged arm element and the drive element of the positioning unit move the charging contact back and forth on the contact surface. For this purpose, the charging contact is arranged at a lower end of the hinged arm element. The drive element serves to move the charging contact and consequently the hinged arm element from an upper retracted position for storing the charging contact to a lower contact position for transferring current or, respectively, contacting the contact surface with the charging contact. In the contact position, a defined contact force is exerted on the contact surface from the positioning unit.

The displacement drive of the drive element exerts a displacement force on the hinged arm element, said displacement drive mechanically interacting with the spring element so only the displacement force can cause a movement of the hinged arm element. The contact spring is coupled to the displacement drive in a mechanical series circuit, meaning they are directly or indirectly coupled to each other. For this purpose, the displacement drive can be directly connected to the contact spring or by interconnecting another mechanical component, such as a lever. Hence, a contact force can also be exerted from the displacement drive and the contact spring together, said contact force being exerted on the contact surface by the charging contact. The mechanical series circuit of the displacement drive and the contact spring makes it possible to move the hinged arm element due to the displacement force of the displacement drive and to further increase the displacement force when contacting the contact surface with the charging contact. The further increased displacement force is then stored by the contact spring connected to the displacement drive and is transferred as a contact force to the hinged arm element or contact surface, respectively. The increase in the displacement force thus does not become a further movement of the hinged arm element but rather a forming of or rather increase in the contact force on the contact surface. Thus, it becomes possible to exert an essentially continually consistent contact force on the contact surface in a retracted position of the charging contact independently of a height of the contact surface over a road or, respectively, of a relative distance of the contact surface and the charging contact.

In an embodiment of the positioning unit, the contact spring can be coupled to the displacement drive via a floating bearing, said contact spring or said displacement drive being able to be secured to a fixed bearing. As per its definition, the fixed bearing cannot be moved relative to any other fixed bearings of the hinged arm element and the drive element. The floating bearing, which directly connects the contact spring to the displacement drive, can have one or more bearing axes. If the contact spring is secured to the fixed bearing, the displacement drive can be connected or coupled to the hinged arm element, and if the displacement drive is secured to the fixed bearing, the contact spring can be connected to the hinged arm element. It is generally arbitrary whether the contact spring and the displacement drive are a translatorally or rotatively acting spring or a displacement drive, respectively.

In another embodiment, the contact spring or the displacement drive can be mechanically coupled to the hinged arm element via a lever of a control gear of the spring element. The lever can be arranged on the hinged arm element or rather be connected thereto in a torque-proof manner so that a movement of the lever causes the hinged arm element to move. For this purpose, it is at first inconsequential whether the contact spring or the displacement drive is directly connected to the lever. Owing to the control gear realized by the lever, the displacement force and the spring force of the contact spring or rather the resulting contact force can be easily transferred to the hinged arm element.

The contact spring can further be mechanically coupled to the displacement drive via a clamping lever of a clamping gear of the spring element. The clamping lever can, for example, be pivotally secured to a fixed bearing of the positioning unit, said contact spring and said displacement drive each gripping a clamping lever either on a shared bearing axis or on different bearing axes or be connected to the clamping lever. If the contact surface is already contacted to the charging contact and moving the hinged arm element is no longer possible as a consequence, a movement of the displacement drive is then transferred to the spring via the clamping lever of the clamping gear. The spring force of the contact spring stored in this manner is exerted on the hinged arm element in consequence of the mechanical series circuit of the contact spring and the displacement drive and their connection to the hinged arm element. The spring force of the contact spring then forms the contact force on the contact surface. If the contact force is several times larger than the displacement force required for moving the hinged arm element, the contact force can be essentially realized to be always consistent independently of a height of a vehicle roof relative to the positioning unit.

It is particularly advantageous if the contact spring is a tension spring. The contact spring can generally be a pressure spring or a torsion spring, however, a particularly compact positioning unit can be realized by using a tension spring.

The displacement device can comprise a back-up battery. In the event of a power outage or another malfunction, the displacement device can then ensure being able to automatically retract the positioning unit to a retracted position owing to an emergency power supply from the back-up battery. The back-up battery can be integrated into the displacement drive or be arranged at a different position of the vehicle.

The displacement drive can be a linear drive, preferably a spindle drive. Depending on the inclination of the spindle, it can also be intended to optionally form the spindle drive as self-locking. The hinged arm element can then be easily moved to a desired position and be secured without any other auxiliary means.

In addition, the linear drive can comprise a magnetic brake. This is particularly advantageous if an inclination of a spindle drive does not cause the drive to self-lock or enables moving the displacement drive in an undesired manner through forces acting on the hinged arm element from the outside. Using the magnet brake, the generated contact force can then be maintained by securing the linear drive, the linear drive and consequently the hinged arm element being able to still be moved despite an undesired movement of the vehicle if a brake force of the magnet brake is exceeded at the linear drive. Damage to the linear drive and the hinged arm element can be prevented in this manner. In the event of a power outage or any other malfunctions, the magnet brake can also loose its magnetic function so that the displacement drive starts to move freely. The positioning unit can then be moved to a retracted position by a lifting spring and/or by an emergency power supply of the displacement drive or of the linear drive, respectively. The magnetic brake can be designed as an operating-current brake or as a quiescent-current brake having a magnetic effect.

The linear drive can comprise a position sensor. By using the position sensor, it becomes possible to set an area within which the hinged arm element can be moved by means of the linear drive. An incremental encoder or an absolute encoder, for example, can be used as a position sensor. It is then always possible to determine an exact working positon of the linear drive. The linear drive can also comprise final position switches, which can be actuated depending on position, and/or pressure switches, which can be actuated depending on force. Furthermore, an amount of a contact force can also be limited by the linear drive being able to be extracted up to a certain final position. Pressure switches can be additionally used for limiting the contact force and can act alone or together with the final position switches for limiting the linear drive. A pressure switch can be arranged directly on the charging contact or on the drive element in the area of the spring element or the displacement drive.

The hinged arm element can be designed as a one-arm system or as a multi-piece scissor system, preferably having a parallel guide, or as a pantograph. In this manner, the hinged arm mechanism can enable a parallel movement of the charging contact starting from a retracted position of the charging contact all the way to the contact position at the contact surface of the vehicle. Additionally, damping elements can be arranged at the hinged arm element, said damping elements guaranteeing a smooth motion sequence.

After contacting the contact surface to the charging contact, the charging contact can be easily retracted to a retracted position on the positioning unit if the spring element comprises at least one lifting spring for exerting a restoring force on the hinged arm element, said restoring force being able to be larger than a weight of the hinged arm element acting inversely to the lifting spring. In this manner, a weight of the hinged arm element and of the charging contact arranged at the hinged arm element can cause the hinged arm element to move from the retracted position to the contact position without this being intended. The lifting spring can prevent this if the lifting spring exerts a restoring force on the hinged arm element. The restoring force acts inversely to the weight and is preferably slightly larger than the weight to prevent the charging contact from sinking or being extracted if the hinged arm element is pressurized with no other force.

It is also advantageous if the lifting spring is a tension spring. It is then possible to realize the positioning unit particularly compactly. Nevertheless, it is possible to use a pressure spring instead of a tension spring or even a torsion spring or spiral spring. Instead of an individual spring, a plurality of springs coupled to each other in a mechanical parallel circuit can be used.

The lifting spring can be mechanically coupled to the hinged arm element via a lever of a control gear of the spring element, an effective length of the lever being able to be realized variably in dependence of a position of the hinged arm element. The lever consequently can be directly fastened to the hinged arm element so that a spring force of the lifting spring can be directly transferred to the hinged arm element. Depending on the length or, respectively, on the direction of the spring force of the lifting spring and on the arrangement of the lever at the hinged arm element, the effective length of the lever can be shortened if an angle formed between the direction of the spring force and the extension of the lever is lesser than or greater than 90°. An effective length of the lever can also be altered by the lifting spring being secured on the hinged arm element with an abutment via a control gear which is realized via a cam plate or a tie rod, for example. The cam plate forms the lever of the control gear. Depending on the position of the cam plate relative to the lifting spring, the effective length of the lever can be influenced. Thus, it is possible to continually exert the same restoring force on the hinged arm element in dependence of a position of the hinged arm element or to increase or decrease the restoring force according to the corresponding requirements in dependence of a position of the hinged arm element. The restoring force can also be adjusted to the displacement force and the contact force. It is advantageous if the restoring force is measured such when the displacement drive fails, as caused by a power outage, for example, that the charging contact is automatically retracted in each position of the hinged arm element due to the restoring force. The positioning unit can thus be operated particularly safely.

The positioning unit can comprise a support frame for securing the positioning unit to a pole or an underpass. The support frame can form or comprise fixed bearings for the hinged arm element and the drive element, for example. In particular, the contact spring or the displacement drive can be directly secured to a fixed bearing on the support frame. The support frame can be secured particularly easily to the pole or the underpass as well as to a bus shelter roof a stop, a tunnel or similar installations, under which a vehicle can pass through.

It is particularly advantageous if the positioning unit comprises a pivoting element by means of which the charging contact can be pivoted from a vertical contact position to a storage position when the positioning unit is in a retracted position. If, for example, the charging contact has comparatively large measurements, for example having roof-shaped guide surface for guiding the contact surface, the pivoting element can pivot the charging contact from the vertical contact position to the storage position, said charging contact preferably being able to be stored in a horizontal position. The positioning unit thus is particularly flat in form when in the retracted position so that other vehicles which are larger in height, such as trucks, can easily pass under said positioning unit without running the risk of collision with the positioning unit. The pivoting element can comprise a cam plate, for example, which interacts with a lever arranged on a lower end of the hinged arm element. When being moved to the retracted position, the lever can grip into the cam plate and be pivoted on the cam plate during a sequence. This pivoting movement can be used for pivoting the charging contact which is secured to the lower end of the hinged arm element. In a simpler embodiment, it is also conceivable to use only a lever or a cam plate for forming the pivoting element.

The charging station according to the invention comprises an electronic charging contact as well as the positioning unit according to the invention. Advantageous embodiments of a charging station can be derived from the dependent claims referring back to claim 1.

In the method according to the invention for realizing an electrically conductive connection between a vehicle, in particular an electric bus or similar, and a charging station, an electrical contact of the charging station is moved relative to a contact surface of the vehicle and contacted therewith by means of a positioning unit arranged above a vehicle, a hinged arm element of the positioning unit being driven by a drive element of the positioning unit, a displacement drive of the drive element exerting a displacement force on the hinged arm element, and a spring element of the drive element mechanically interacting with the displacement drive, said displacement drive and a contact spring of the spring element being coupled to each other in a mechanical series circuit, and a contact force being exerted on the contact surface from the displacement drive and the contact spring. The description of advantages of the positioning unit according to the invention is referred to regarding the advantageous effects of the method.

By means of the hinged arm element and the drive element, the charging contact can be positioned between a contact position for transferring current, an extracted position for disrupting current and a retracted position for storing the charging contact. For this purpose, it can be intended that the contact force be[1] exerted on the contact surface in the contact position and that only the displacement force acts on the hinged arm element in the extracted position, which can be any position between the contact position and the retracted position. In the retracted position, no or only a slight displacement force can act on the hinged arm element, making a downward movement of the hinged arm element and the charging contact impossible.

Hier den subjunctive bitte stehen lassen.

The contact position can be advantageously realized below the positioning unit to the retracted position of the positioning unit independently of a relative distance of the contact surface of the vehicle. Thus it becomes possible to also contact vehicles having different heights relative to a road with the positioning unit. Preferably, the contact surface of the vehicle can be arranged on a vehicle roof or at a different suitable position on an upper side of the vehicle.

It is particularly advantageous if the contact force is realized consistently in the contact position while a relative distance of the contact surface of the vehicle below the positioning unit is switched to the retracted position of the positioning unit. Changing the relative distance of the contact surface also causes the distance of the contact surface to a road to be changed as well. The relative distance can be changed by lowering the vehicle over an undercarriage or by loading the vehicle. Owing to the fact that the contact force is comparatively large with respect to the displacement force, the contact force can be realized essentially consistently, even if the relative distance is altered. A consistent contact force can be realized even easier independently of the relative distance if effective lengths of levers, onto which the contact spring and/or the displacement drive grip, are changed in dependence of a position of the hinged arm element.

For forming the contact force in the contact position, the displacement drive can be moved to a displacement position with a maximal displacement path, said contact force being able to be transferred from the contact spring to the displacement drive. If the displacement drive is a linear drive, the displacement drive can be moved between a maximal displacement path and a minimal displacement path. In the retracted position, the displacement drive can be in the displacement position with the minimal displacement path. The hinged arm element is moved to the extracted position by the displacement drive enlarging the displacement path and thus exerting the displacement force on the hinged arm element and moving the hinged arm element. For this purpose, the contact spring is unloaded since it is coupled to the displacement drive in the mechanical series circuit. It is, however, also possible to pre-load the contact spring in the positions described above via a clamping lever, for example. After attaining the contact position, the hinged arm element cannot be moved further so that a further enlargement of the displacement path up to the maximal displacement path leads to the contact spring being pre-loaded by the displacement drive. If the contact spring is already pre-loaded, the pre-load is then increased. The spring force exerted thus by the contact spring acts directly or indirectly on the hinged arm element via the displacement drive and exerts the contact force on the contact surface. It thus becomes possible to continually generate a mostly consistent contact force independently of a relative position of the charging contact in the contact position without a measurement of the contact force or particular settings in the positioning unit being necessary at vehicles to be contacted.

Further embodiments of the method can be derived from the dependent claims referring back to device claim 1.

BRIEF DESCRIPTION OF THE DRAWING FIGURES

In the following, a preferred embodiment of the invention is further described with reference to the enclosed drawings.

In the drawings:

FIG. 1d illustrates the positioning unit in a middle extracted position in the side view from the left;

FIG. 1f illustrates the positioning unit in a lower contact position in the side view from the left;

FIG. 2d illustrates the positioning unit in the middle extracted position in the side view from the right;

FIG. 2f illustrates the positioning unit in the lower contact position in the side view from the right;

FIG. 3 illustrates the positioning unit in the retracted position in the side view from the right;

FIG. 4 illustrates the positioning unit in the upper contact position in the side view from the right;

FIG. 5 illustrates the positioning unit in the lower contact position in the side view from the right.

DETAILED DESCRIPTION OF THE INVENTION

Figure 1A:
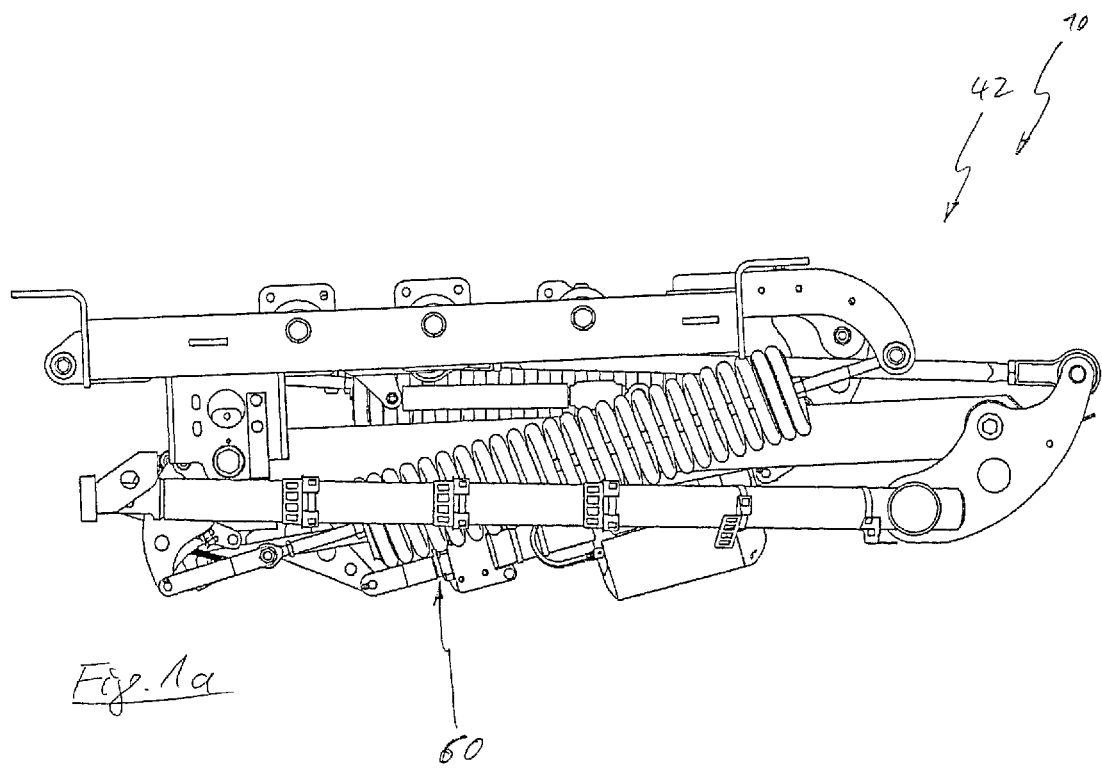
FIG. 1a illustrates a positioning unit in a retracted position in a side view from the left.
Figure 2A:
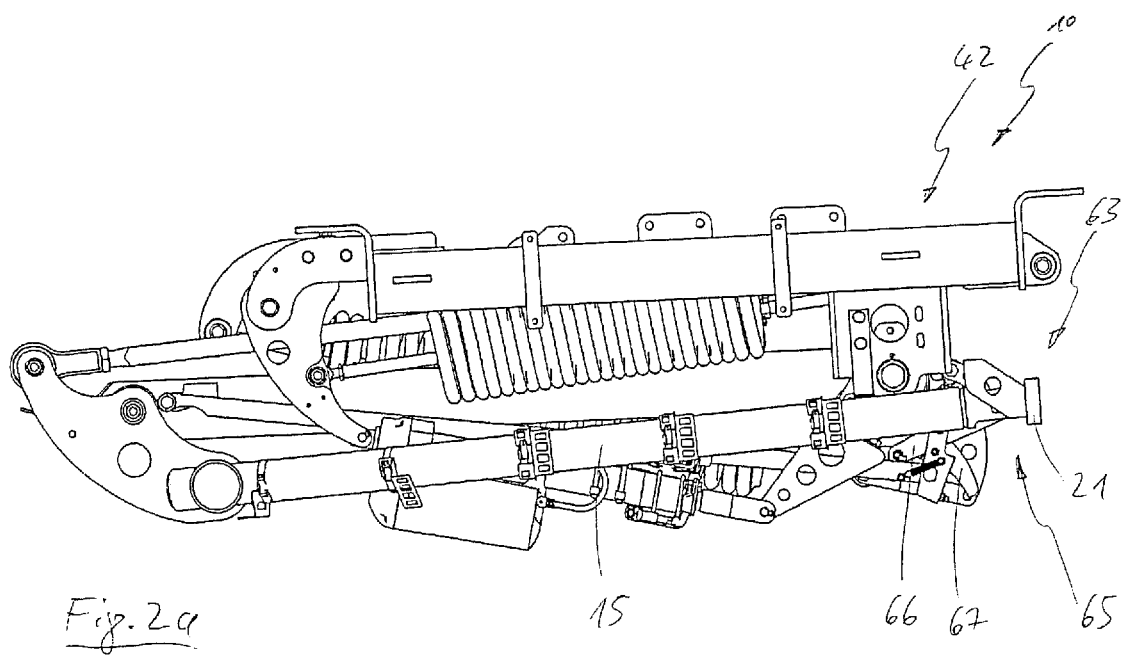
FIG. 2a illustrates a positioning unit in the retracted position in a side view from the right.
Figure 1B:
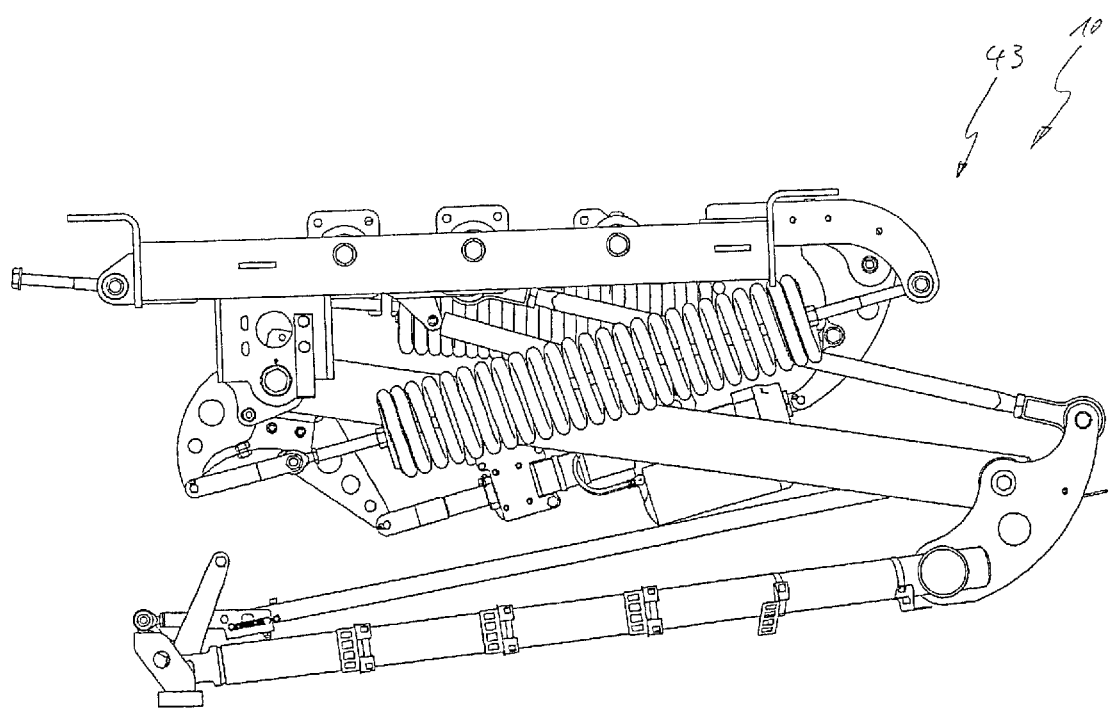
FIG. 1b illustrates the positioning unit in an upper extracted position in a side view from the left.
Figure 2B:
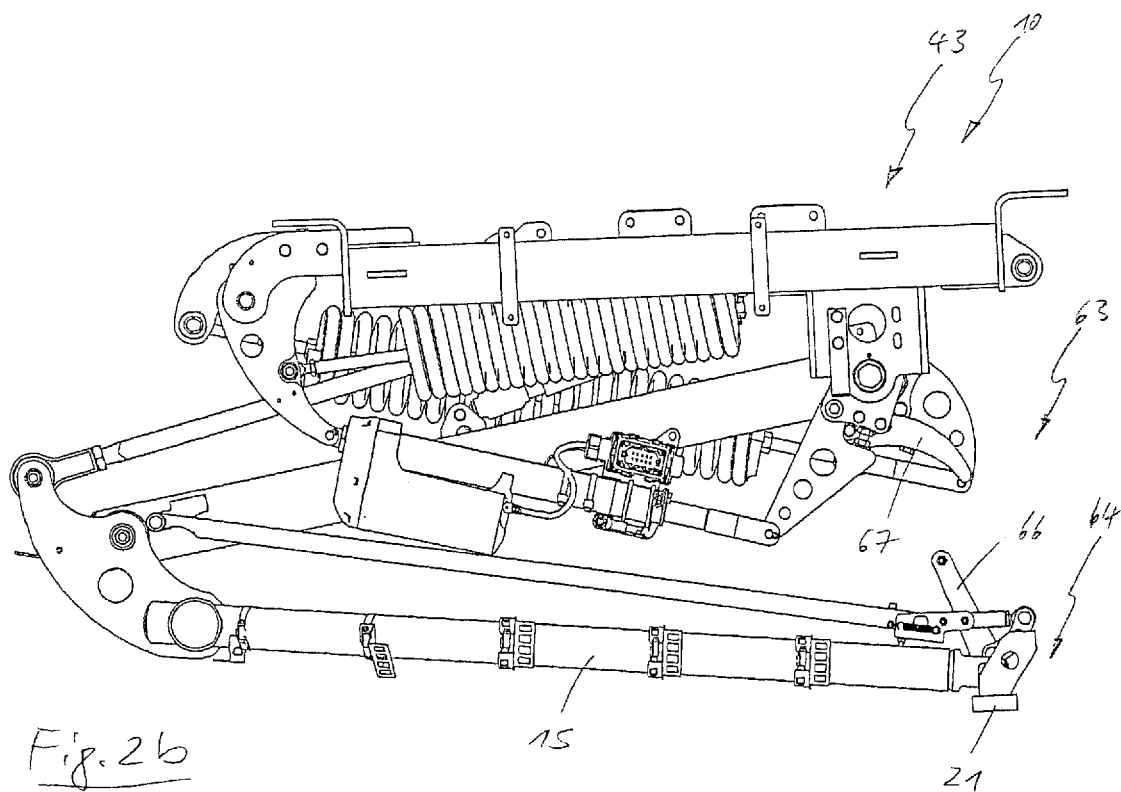
FIG. 2b illustrates the positioning unit in the upper extracted position in a side view from the right.
Figure 1C:
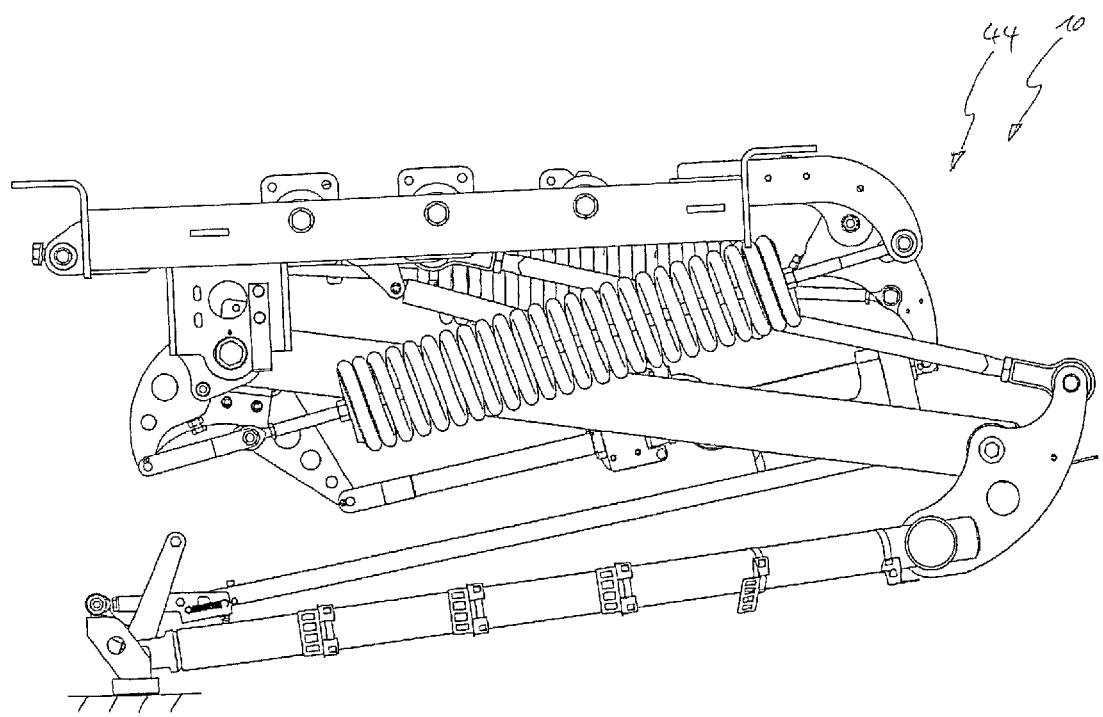
FIG. 1c illustrates the positioning unit in an upper contact position in the side view from the left.
Figure 2C:
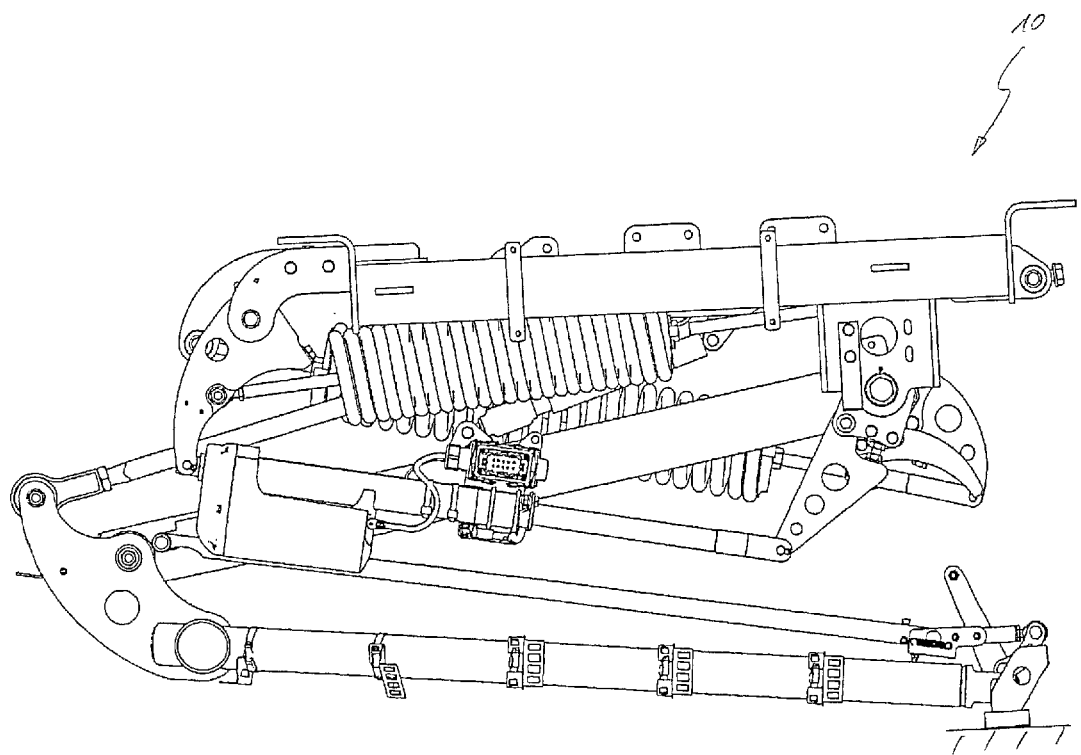
FIG. 2c illustrates the positioning unit in the upper contact position in the side view from the right.
Figure 2A:
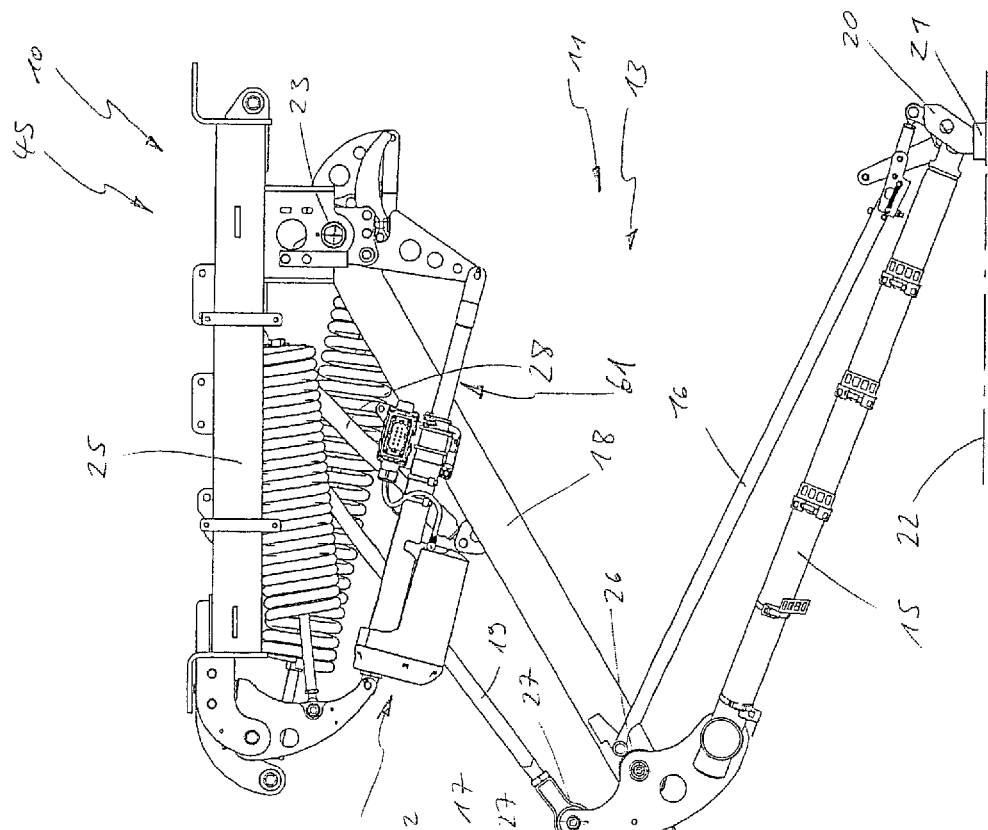
Figure 1A:
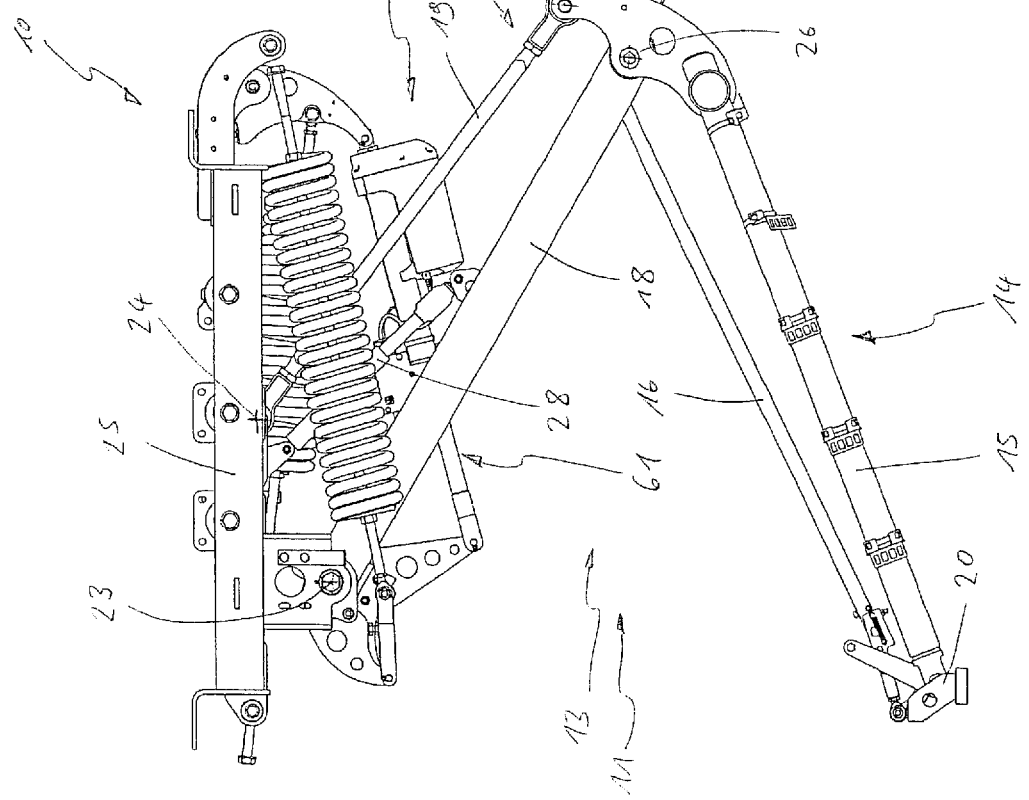
Figure 2E:
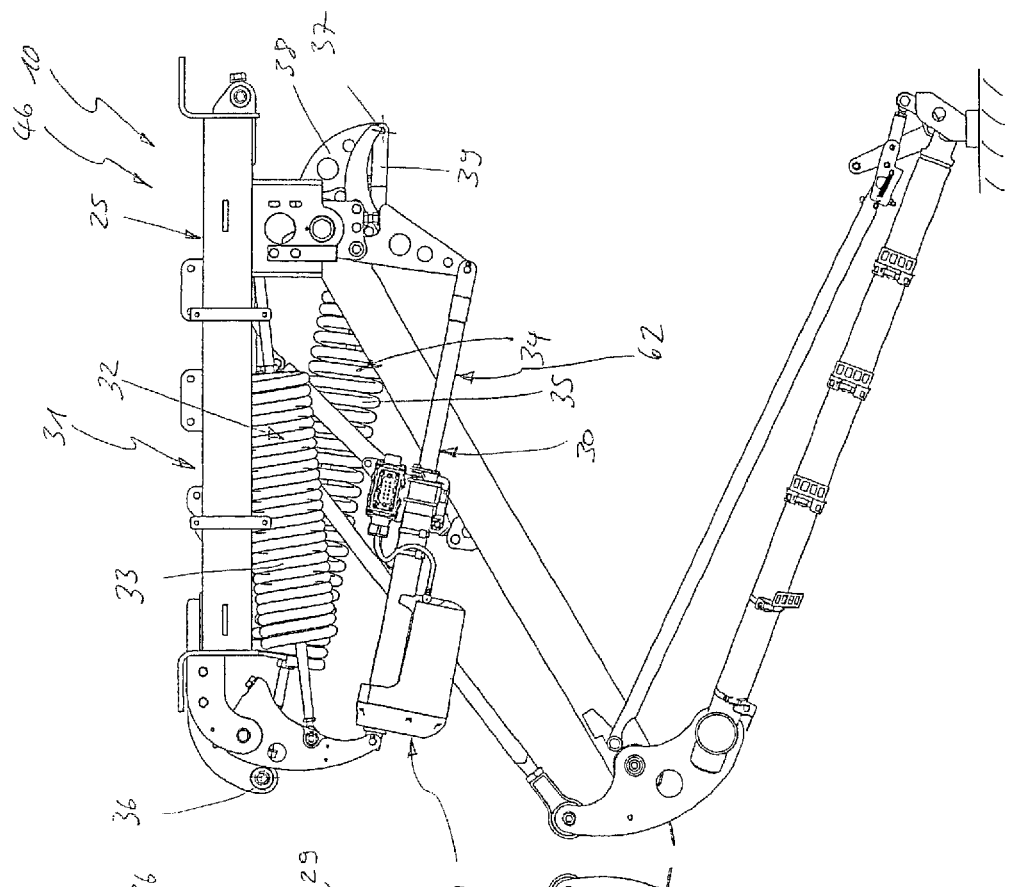
FIG. 2e illustrates the positioning unit in the middle contact position in the side view from the right.
Figure 1E:
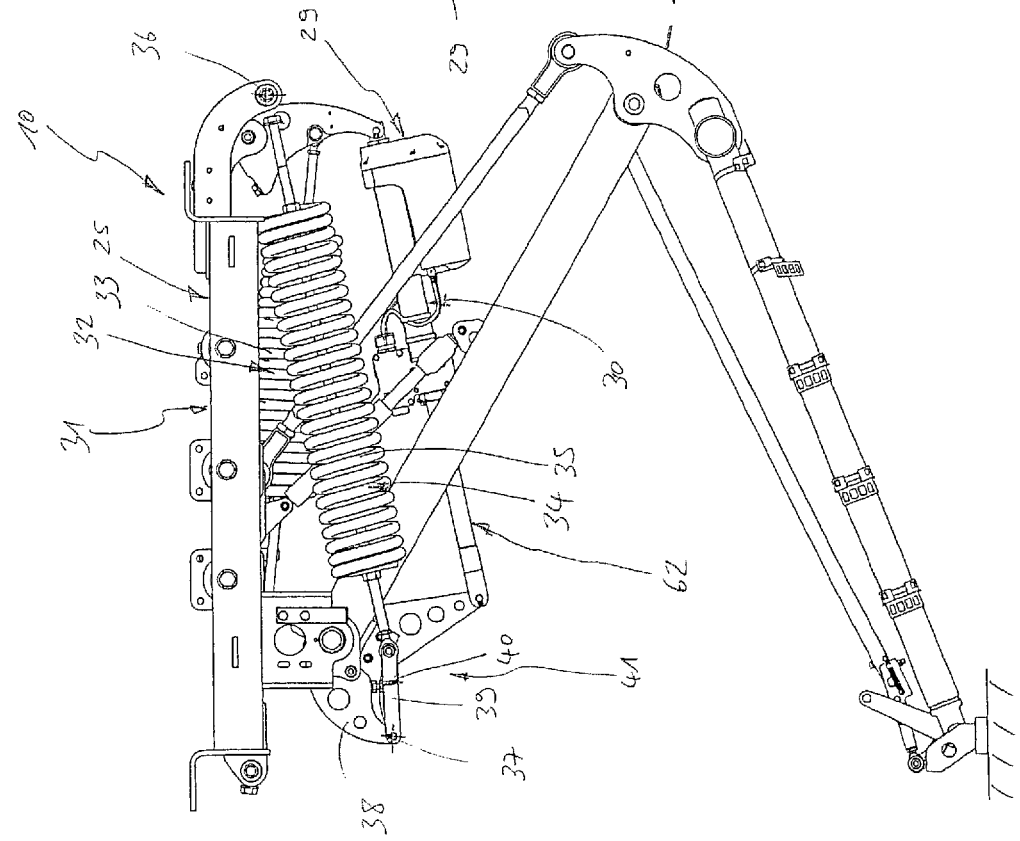
FIG. 1e illustrates the positioning unit in a middle contact position in the side view from the left.

A synopsis of FIGS. 1a to 2f illustrates a positioning unit 10 in different views and positions. FIGS. 3 to 5 illustrate the positioning unit 10 in a schematically supplementary view. Contacting a contact surface (not illustrated in this instance) is represented merely symbolically. The positioning unit 10 comprises a hinged arm element 11 and a drive element 12 for driving the hinged arm element 11. The hinged arm element 11 is realized as a one-arm system 13 and comprises an upper scissor 14 having an upper scissor arm 15 and an upper coupling rod 16 as well as a lower scissor 17 having a lower scissor arm 18 and a lower coupling rod 19. An upper coupling member 20 is pivotally secured to the upper scissor arm 15 so that a holder 21 of the positioning unit 10 can be moved continually parallel to a horizontal plane 22 for a charging contact (not illustrated in this instance) of a charging station (also not illustrated in this instance). For this purpose, the upper coupling member 20 is connected to the upper coupling rod 16. The lower scissor arm 18 and the lower coupling rod 19 are each pivotally secured to fixed bearings 23 and 24, respectively, on a support frame 25 of the positioning unit 10. The lower scissor arm 18 is pivotally connected to the upper scissor arm 15 via axis 26 and the lower coupling rod 19 is pivotally connected to the upper scissor arm 15 via axis 27. A pivoting movement of the upper scissor arm 15 consequently leads to a parallel movement of the holders 21 with respect to the horizontal plane 22. A dampening element 28 is attached to the lower scissor arm 18 for dampening a movement.

The drive device 12 comprises a displacement drive 29, which is realized as a linear drive 30, as well as a spring element 31 having a contact spring 32, which is realized as a tension spring 33, and a lifting spring 34, which is realized as a tension spring 35. The lifting spring 34 is secured to a fixed bearing 36 on the support frame 25 and to an axis 37 of a lever 38. A securing section 39 connects the lever 38 to the lifting spring 34. The lever 38 forms a control gear 41 in conjunction with the securing section 39 and an abutment 40. Depending on the position of the hinged arm element 11, the lever 38 connected to the lower scissor arm 18 in a torque-proof manner is pivoted relative to the lifting spring 34 so an effective length of the lever 38 is shortened or lengthened. The lifting spring 34 acts directly on the axis 37 in a retracted position 42, an upper extracted position 43 and an upper contact position 44 of the positioning unit 10. The securing section 39 rests against the abutment 40 in a middle extracted position 45, a middle contact position 46 and a lower contact position 47 of the positioning unit 10 so an effective length of the lever 38 is significantly shortened by pivoting said lever 38. Thus, it becomes possible to adjust the lifting spring 34 or rather its effective restoring force to a position of the positioning unit 10. The hinged arm element 11 comprises a weight as well as a charging contact (not illustrated in this instance) in conjunction with the drive element 12 due to its design, said weight acting on the charging contact or the holder 21. The lifting spring 34 exerts a spring force or a restoring force, respectively, which surpasses the weight so as to ensure that the positioning unit 10 is restored to the retracted position during a power outage 42 independently of which position the positioning unit 10 is in.

A lever 48, which forms a control gear 49 for the hinged arm element 11, is permanently secured to the hinged arm element 11 or rather the lower scissor arm 18. The linear drive 30 is pivotally secured to an axis 50 of the lever 48. The linear drive 30 is further connected to the contact spring 32 in a mechanical series circuit 53 via a clamping lever 51 of a clamping gear 52. Hence, the clamping lever 51 is pivotally secured to a fixed bearing 54 on the support frame 25, an axis 56 being arranged at a middle section 55 of the clamping lever 51 and an axis 58 being arranged at an end section 57 of the clamping lever 51. The contact spring 32 is secured to a fixed bearing 59 on the support frame 25 and the axis 56, the linear drive 30 being secured to axis 58 on the clamping lever 51 and to axis 50 on the lever 48.

The linear drive 30 has a minimal displacement path 60 in the retracted position 42 so that no displacement force is exerted on the lever 48. The contact spring 32 is also unloaded. When in the middle extracted position 45, for example, the linear drive 30 has a middle displacement path 61 and thus exerts a displacement force on the lever 48, whereby the restoring force of the lifting spring 34 was surpassed and the hinged arm element 11 could be moved to the middle extracted position 45. The displacement force is so large in this instance that the restoring force is surpassed by a sum of the weight and the displacement force. When in the middle contact position 46, for example, the linear drive 30 has a maximal displacement path 62, a position of the lever 48 not having changed with respect to the middle extracted position 45. The maximal displacement path 62 causes the clamping lever 51 to pivot around the fixed bearing 54 in such a manner that the contact spring 32 is loaded. The spring force resulting from the thus generated spring load acts on the lever 48 and thus on the hinged arm element 11 as a result of the mechanical series circuit 53 of the contact spring 32 and the linear drive 30, whereby a contact force acts on the holder 21 or rather the charging contact (not illustrated in this instance) as a consequence. The contact force is sufficiently large for realizing an electrical charging contact and can be essentially consistent or rather be realized at the same height in the upper contact position 44, in the middle contact position 46 and the lower contact position 47 as well as in any arbitrary contact position between the contact positions illustrated in this instance.

The positioning unit 10 further comprises a pivoting element 63 for the charging contact (not illustrated in this instance) or for the holder 21.

The holder 21 can be horizontally pivoted parallel to the horizontal plane 22 from a vertical contact position 64 to a storing position 65 in the retracted position 42 by means of the pivoting element 63. The pivoting element 63 comprises a lever 66 at the upper coupling member 20 and a cam plate 67 arranged permanently on the lower scissor arm 18. When retracting the hinged arm element 11 to the retracted position 42, the lever 66 grips into the cam plate 67 in such a manner that the lever 66 slides along the cam plate 67 and is pivoted. The pivoting of the lever 66 causes the holder 21 or rather the upper coupling member 20 to turn to the storing position 65 by approximately 90°.

The invention claimed is:
1. A positioning unit (10) for a charging station of an electrically driven vehicle, in particular an electric bus or similar, said positioning unit being able to be arranged above a vehicle, an electrical charging contact of the charging station being able to be moved relative to a contact surface of the vehicle and be contacted thereto by means of the positioning unit, said positioning unit comprising a hinged arm element (11) and a drive element (12) for driving the hinged arm element, said drive element comprising a displacement drive (29) for exerting a displacement force acting on the hinged arm element and a spring element (31) mechanically interacting with the displacement drive,
characterized in that
the spring element has at least one contact spring (32), said displacement drive and said contact spring being coupled to each other in a mechanical series circuit (53) in such a manner that a contact force can be exerted on the contact surface from the displacement drive and the contact spring.

2. The positioning unit according to claim 1,
characterized in that
the contact spring (32) is coupled with the displacement drive (29) via a floating bearing (56, 58), said contact spring (32) or said displacement drive being secured at a fixed bearing (59).

3. The positioning unit according to claim 1,
characterized in that
the contact spring (32) or the displacement drive (29) is mechanically coupled with the hinged arm element (11) via a lever (48) of a control gear (49) of the spring element (31).

4. The positioning unit according to claim 1, characterized in that
the contact spring (32) is mechanically coupled with the displacement drive (29) via a clamping lever (51) of a clamping gear (52) of the spring element (31).

5. The positioning unit according to claim 1, characterized in that
the contact spring (32) is a tension spring (33).

6. The positioning unit according to claim 1, characterized in that
the displacement drive (29) comprises a back-up battery.

7. The positioning unit according to claim 1, characterized in that
the displacement drive (29) is a linear drive (30), preferably a spindle drive.

8. The positioning unit according to claim 7, characterized in that
the linear drive (30) comprises a magnetic brake.

9. The positioning unit according to claim 7, characterized in that
the linear drive (30) comprises a position sensor.

10. The positioning unit according to claim 1, characterized in that
the hinged arm element (11) is realized as a one-arm system (13) or as a scissor mechanism, preferably having a parallel guide, or as a pantograph.

11. The positioning unit according to claim 1, characterized in that
the spring element (31) has at least one lifting spring (34) for exerting a restoring force on the hinged arm element (11), said restoring force being greater than a weight of the hinged arm element acting inversely to the lifting spring.

12. The positioning unit according to claim 11, characterized in that
the lifting spring (34) is a tension spring (35).

13. The positioning unit according to claim 11, characterized in that
the lifting spring (34) is mechanically coupled with the hinged arm element (11) via a lever (38) of a restoring gear (41) of the spring element (31), an effective length of the lever being able to be changed depending a position (42, 43, 44, 45, 46, 47) of the hinged arm.

14. The positioning unit according to claim 1, characterized in that
the positioning unit (10) has a support frame (25) for fastening the positioning unit to a pole or an underpass.

15. The positioning unit according to claim 1, characterized in that
the positioning unit (10) comprises a pivoting element (63), by means of which the charging contact can be pivoted from a vertical contact position (64) to a storage position (65) when the positioning unit is in a retracted position (42) for storing the charging contact.

16. A charging station, comprising an electrical charging contact and a positioning unit (10) according to claim 1.

17. A method for attaining an electrically conductive connection between a vehicle, in particular an electric bus or similar, and a charging station, an electrical charging contact of the charging station being moved above a vehicle relative to a contact surface of the vehicle and contacted thereto by means of a positioning unit (10), a hinged arm element (11) of the positioning unit being driven by a drive element (12) of the positioning unit, a displacement drive (29) of the drive element causing a displacement force on the hinged arm element and a spring element (31) of the drive element mechanically interacting with the displacement drive, characterized in that
the displacement drive and a contact spring (32) of the spring element are coupled with each other in a mechanical series circuit (53) and in that a contact force is exerted on the contact surface from the displacement drive and the contact spring.

18. The method according to claim 17, characterized in that
by means of the hinged arm element (11) and the drive element (12), the charging contact is positioned between a contact position (44, 46, 47) for transmitting current, an extracted position (43, 45) for disrupting current and a retracted position (42) for storing the charging contact.

19. The method according to claim 18, characterized in that
the contact position (44, 46, 47) is formed below the positioning unit (10) to the retracted position (42) of the positioning unit independently of a relative distance of the contact surface of the vehicle.

20. The method according to claim 18, characterized in that
in the contact position (44, 46, 47), the contact force is exerted consistently while changing a relative distance of the contact surface of the vehicle below the positioning unit (10) to the retracted position (42) of the positioning unit.

21. The method according to claim 18, characterized in that
for forming the contact force in the contact position (44, 46, 47), the displacement drive (29) is moved to a displacement position having a maximal displacement path (62), said contact force being transmitted from the contact spring (32) to the displacement drive.

\* \* \* \* \*